Oct. 30, 1962   N. J. ROGERS   3,060,804
ADJUSTABLE EYEGLASS HINGE
Filed Aug. 21, 1959
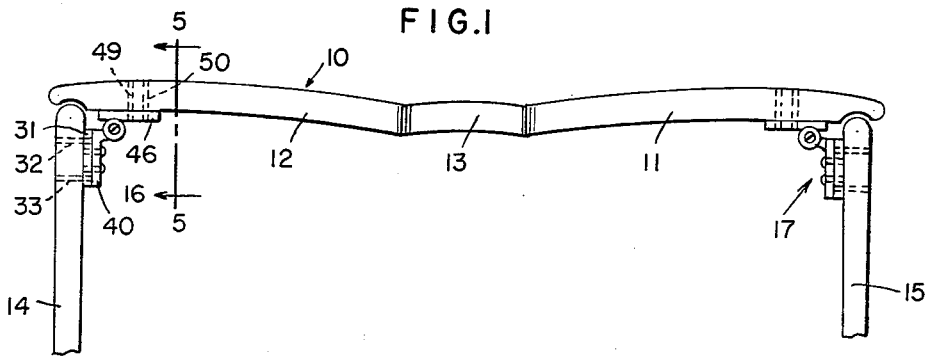
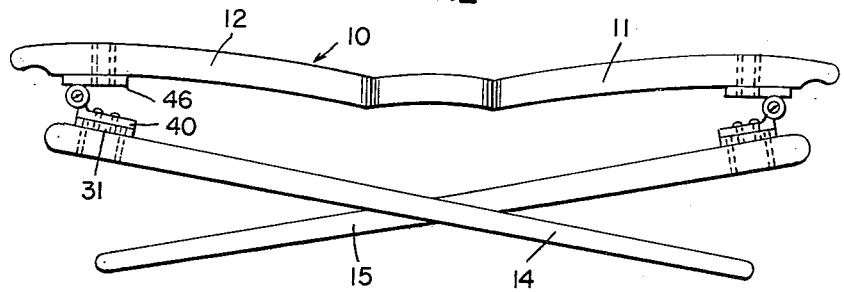
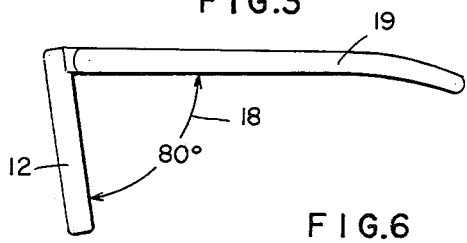
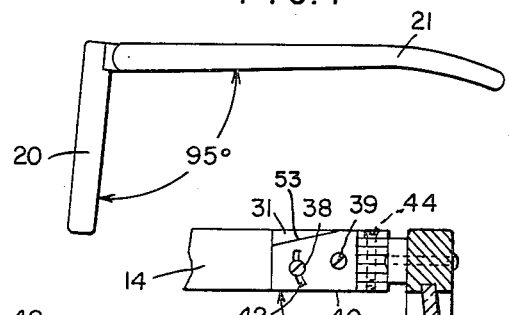
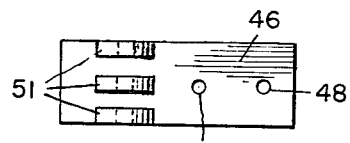
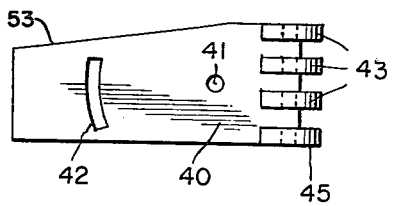
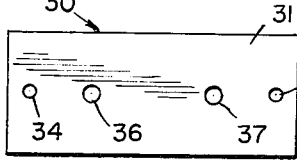
INVENTOR.
Nathan Jay Rogers
BY
*Shoemaker & Mattare*
ATTYS

United States Patent Office 3,060,804
Patented Oct. 30, 1962

3,060,804
ADJUSTABLE EYEGLASS HINGE
Nathan Jay Rogers, 2190 Thomas Road, Beaumont, Tex.
Filed Aug. 21, 1959, Ser. No. 835,308
1 Claim. (Cl. 88—53)

This invention relates to eyeglass frames and pertains more particularly to an adjustable type of frame for making proper temple adjustments to eyeglasses.

In fitting eyeglasses to an individual, it is important to determine and adjust the temple bars with relation to the lens frame so as to achieve the proper angular relationship therebetween and this, of course, will vary from individual to individual. Conventionally, this adjustment is achieved by bending the frame assembly and which is usually done by heating the same and affecting the actual bending by special tools or pliers provided for this purpose. Naturally, this bending operation is substantially impossible with many types and styles of frames presently in use. For example, many frames employ plastic, metal or jeweled trims which, unfortunately, are often so placed and positioned that they are precisely at that point in the frame wherein the adjustment or bending must be made to achieve the proper angular relationship for comfort and proper use by the wearer. Moreover, there are many other frames which cannot be correctly or properly adjusted for fear of damaging or breaking the frame itself.

It is, therefore, a primary object of this invention to achieve the above-described proper adjustment by means which does not require the bending or distorting of the frame assembly.

More particularly, it is an object of this invention to provide an improved type of hinge assembly for use in conjunction with eyeglass frames wherein the hinge assembly incorporates means permitting of angular adjustment between the temple bars and the lens frame.

Another object of this invention is to provide an improved eyeglass hinge assembly that incorporates a mounting bracket which is secured to the frame front of an eyeglass assembly to which is attached one member of a hinge assembly, such bracket and member of the hinge assembly being so secured together as to permit a limited amount of angular adjustment therebetween, the hinge assembly including a further hinge element or member pivotally attached to the first member and which is secured to one of the temple bars of the eyeglass assembly.

With the above and other objects in view, the invention consists in the construction and novel combination and arrangement of parts hereinafter fully described, illustrated in the accompanying drawing and pointed out in the claim hereto appended, it being understood that various changes in the form, proportions, and minor details of construction, within the scope of the claim, may be resorted to without departing from the spirit or sacrificing any of the advantages of the invention.

In the drawing:

FIG. 1 is a plan view of a pair of eyeglasses showing the novel hinge assembly associated therewith;

FIG. 2 is a view similar to FIG. 1 but showing the eyeglasses in partially folded position;

FIG. 3 is a side elevational view illustrating an angular relationship between the frame front and the temple bars in which the angle is such as to be termed as a 10° pantoscopic effect;

FIG. 4 is a view similar to FIG. 3 but showing the angular relationship between the frame front and the temple producing a 5° retroscopic effect;

FIG. 5 is an enlarged sectional view, taken substantially along the plane of section line 5—5 in FIG. 1, illustrating further details of the hinge assembly;

FIG. 6 is an elevational view of the hinge piece which is attached to the frame front;

FIG. 7 is an elevational view of the companion hinge piece to the hinge piece shown in FIG. 6 and which is adjustably attached to the temple bar; and FIG. 8 is an elevational view of the temple bar attached mounting member for the hinge piece of FIG 7.

As can be best seen in FIGS. 1 and 2, the pair of eyeglasses shown therein and indicated generally by the reference character 10, includes a frame front having two lens frames 11 and 12 connected together by a nose piece 13 and there being a pair of temple bars 14 and 15 attached to opposite ends of the frame front, all as is conventional. The temple bars 14 and 15 are pivotally attached to the frame front by means of hinge assemblies indicated generally by the reference characters 16 and 17, each of said hinge assemblies being of similar construction.

As can be best seen in FIGS. 3 and 4, it is customary to provide a given or fixed angular relationship between the frame front and the temple bars in order to accommodate for the particular shape and configuration of the user's head. In some cases, the angle formed between the frame front, such as that indicated by the reference character 18 in FIG. 3 and the temple bars 19, is such as to be less than 90°, in this particular case, 80°. In such a case, the angle formed is said to be of 10° pantoscopic effect. On the other hand, in some instances, as for example is shown in FIG. 4, the angle is greater than 90° between the frame front 20 and the temple bars 21, in this case 95°. The eyeglasses are then said to have 5° retroscopic effect. Alternatively, of course, the angle may be exactly 90° in which case there is neither pantoscopic nor retroscopic angle or effect. However, the exact angle will vary from individual to individual and in almost every instance, when fitting a pair of eyeglasses to an individual user, it is necessary to make some adjustment in order to achieve the proper angle for that particular user.

To this end, the hinge assemblies 16 and 17 are constructed as best shown in FIGS. 5–8. Each hinge assembly includes a mounting plate indicated generally by the reference character 30 in FIG. 8 and which is in the form of a generally rectangular strip 31 adapted to be positioned against the inner side of its corresponding temple bar and rigidly affixed thereto as by rivets 32 and 33, see particularly FIG. 1. The body of the plate 31 is provided with apertures 34 and 35 adjacent its opposite ends and these apertures are provided for the reception of the rivets or other suitable fasteners 32 and 33 and by means of which the plate is rigidly affixed to its associated temple bar.

Intermediate the openings 34 and 35, the plate 31 is provided with a pair of threaded openings 36 and 37 which receive screw threaded fasteners 38 and 39, see particularly FIG. 5, by means of which the hinge member 40 is attached to the plate 31 and consequently to the associated temple bar.

The hinge member 40 is shown in more detail in FIG. 7 and will be seen to consist of an elongate strip having an opening 41 intermediate its ends and an arcuate slot 42 adjacent one end thereof and the center of curvature of which is coincidental with the center of the opening 41. At the opposite end of the hinge member there are provided a series of outstanding lugs 43 provided with vertically aligned apertures for the reception of a hinge pin 44, see particularly FIG. 5. As is conventional in such constructions, the lower most lug 45 may be provided with threads in its opening and the hinge pin 44 is threaded at its lower end to be rigidly anchored within this lug 45.

The other hinge member 46 is shown more particularly in FIG. 6 and will be seen to be provided with a pair of openings 47 and 48 for the reception of rivets or other suitable fasteners 49 and 50, see particularly FIG. 1, by means of which this hinge member is rigidly affixed to a corresponding end of the lens frame of the eyeglasses. This hinge member 46 is also provided with outstanding lugs 51 adjacent one end thereof provided with vertically aligned apertures and these lugs are interdigitated with the lugs 43 of the hinge member 40, with the openings in the two sets of lugs being aligned for the reception of the hinge pins therethrough so that the temple bars are hingedly affixed to the frame front.

By virtue of the elongation of the arcuate slot 42 and the placement of its center of curvature coincidental with the opening 41, by loosening the fasteners 38 and 39, the entire temple bar assembly may be adjusted angularly with respect to the frame front to produce the desired pantoscopic or retroscopic effect, as is required for the individual user. When the proper angle has been achieved, the fasteners 38 and 39 are, of course, tightened securely to fix the angular relationship.

It will be noted as seen particularly in FIGS. 5 and 7 that the upper edge of hinge member 40 is provided with a cutout portion indicated by reference numeral 53. It will be apparent from an inspection of FIG. 5 that the cutout portion 53 enables hinge member 40 to be rotated and adjusted with respect to temple bar 14 particularly into the pantoscopic position as illustrated in FIG. 3 without hinge member 40 projecting substantially above the associated temple bar. This, of course, ensures that the adjustable hinge construction is hidden from view while the glasses are being worn, and there are not upwardly or outwardly projecting portions which might snag on external objects.

Not only is the present invention readily adaptable for making rapid and easy adjustments of the temple bars with respect to the frame front but, more importantly, such adjustment can be made without, in any way, deforming, bending or distorting the frame assembly itself. This is extremely important in view of the fact that many frames now in vogue employ trim or ornamentation which extends into the area of the frame assembly which requires bending to achieve the proper angular relationship and, naturally, such ornamentation or trim is easily damaged or broken if bending of the frame is attempted. On the other hand, it frequently occurs that the construction of the frame itself is such that bending thereof will result in damage or breakage of the frame itself or of the lenses carried by the frames.

In such cases, where bending is known to be detrimental or at least likely to cause damage or breakage of the eyeglasses, it frequently occurs that the proper adjustment is not made and for this reason, the glasses never properly fit the user. Consequently, it can be seen that the present invention permits each and every pair of eyeglasses to be adjusted exactly to the proper angle required for the individual user to which they are fitted without any danger of damage to the eyeglasses themselves. It will be appreciated that the hinge construction need be of no greater dimensional characteristics than conventional hinge assemblies, with the single exception that the plate 31 is added. Therefore, the eyeglasses may be folded in the conventional manner and easily carried in a conventional case.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by this claim.

I claim:

In an eyeglass assembly for every day use comprising a front frame having a pair of lenses fixedly disposed therein and a pair of elongated temple bars, each of said temple bars including an outer surface presented to view when the assembly is being worn and an opposite inner surface hidden from view when the assembly is being worn, means hingedly interconnecting the outer end portions of each of said temple bars to said front frame, said means including mechanism for adjustably altering the angle between said temple bars and said front frame to selectively achieve a pantoscopic or retroscopic effect as desired, said mechanism comprising a generally rectangular mounting plate fixed to said inner surface of each temple bar adjacent the front frame, said means including a first hinge member fixed to an end portion of said front frame, said first hinge member being provided with a plurality of lugs extending outwardly therefrom and having vertically aligned apertures formed therethrough, a second hinge member, said second hinge member having a plurality of lugs extending outwardly therefrom and having vertically aligned apertures formed therethrough, the lugs of said first hinge member being interdigitated with the lugs of said second hinge member, a hinge pin extending through the vertically aligned apertures of the lugs in each of said hinge members for pivotally interconnecting said hinge members to one another, said second hinge member comprising an elongated member having an opening formed therein adjacent the lugs thereof and being provided at that end thereof remote from the lugs thereof with an elongated arcuate slot having its center of curvature coincidental with the center of said opening, said mounting plate having a pair of tapped openings therein spaced apart in distance equal to the distance between said arcuate slot and the opening in said second hinge member, threaded fastening elements extending through said opening and slot in said second hinge member and into the tapped openings in the associated mounting plate to permit angular adjustment of said second hinge member relative to said mounting plate, said second hinge member and said mounting plate having a width approximately that of the associated temple bar and said second hinge member having a cutout portion along the upper edge thereof such that said second hinge member and said mounting plate are substantially hidden from view when said second hinge member and said mounting plate have been angularly adjusted relative to one another while the assembly is being worn and do not project above the associated temple bar or laterally outwardly thereof.

References Cited in the file of this patent

UNITED STATES PATENTS

| | | |
|---|---|---|
| 1,243,466 | Weigel | Oct. 16, 1917 |
| 1,252,126 | Letzeisen | Jan. 1, 1918 |
| 1,380,166 | Wall et al. | May 31, 1921 |
| 1,570,880 | Dunkelsberg | Jan. 26, 1926 |
| 2,825,266 | Kleinman | Mar. 4, 1958 |

FOREIGN PATENTS

| | | |
|---|---|---|
| 16,671 | Germany | Mar. 13, 1892 |
| 1,160,167 | France | July 8, 1958 |